United States Patent
Hargrove

(10) Patent No.: US 6,891,804 B2
(45) Date of Patent: May 10, 2005

(54) METHOD AND APPARATUS FOR DESIRABLE NETWORK COMPONENTS

(75) Inventor: Keith R. Hargrove, Milpitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 867 days.

(21) Appl. No.: 09/738,936

(22) Filed: Dec. 15, 2000

(65) Prior Publication Data

US 2002/0085500 A1 Jul. 4, 2002

(51) Int. Cl.[7] .......................... H04L 12/28; G01R 31/08
(52) U.S. Cl. .................. 370/254; 370/252; 370/238
(58) Field of Search ............................. 370/254, 469, 370/467, 252, 230, 238; 711/114, 100; 709/230, 220, 249; 710/100, 38

(56) References Cited

U.S. PATENT DOCUMENTS 6,243,510 B1 * 6/2001 Rauch .......................... 385/15
6,725,303 B1 * 4/2004 Hoguta et al. .............. 710/106

* cited by examiner

*Primary Examiner*—Duc Ho
(74) *Attorney, Agent, or Firm*—Osha & May L.L.P.

(57) ABSTRACT

The present invention provides a method and apparatus for desirable network components. One embodiment selects connection components for use in network components, where the most desirable components are selected from a set of components associated with a plurality of network protocols having identical physical layers. Another embodiment of the present invention uses Gigabit Ethernet connection components, which communicate using the Fiber Channel network protocol. Since the physical layer of Gigabit Ethernet and Fiber Channel are the same, the less expensive Gigabit Ethernet components carry the electronic signals to the Fiber Channel devices in the same way as Fiber Channel connection components. Thus the embodiment communicates using the Fiber Channel protocol over Gigabit Ethernet components. In yet another embodiment of the present invention, the network component is a storage device such as a redundant array of inexpensive disks (RAID) device.

27 Claims, 8 Drawing Sheets

Connection Component Selection

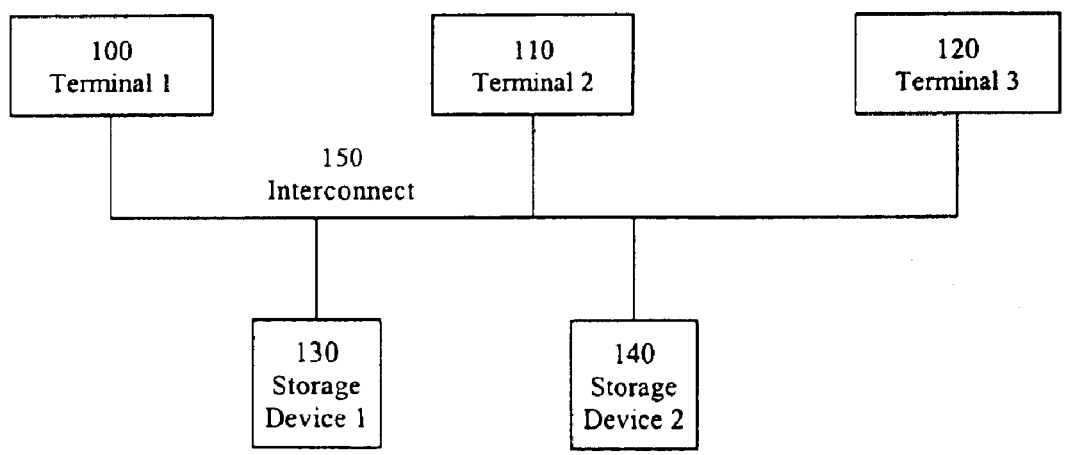
Figure 1: Computer Network

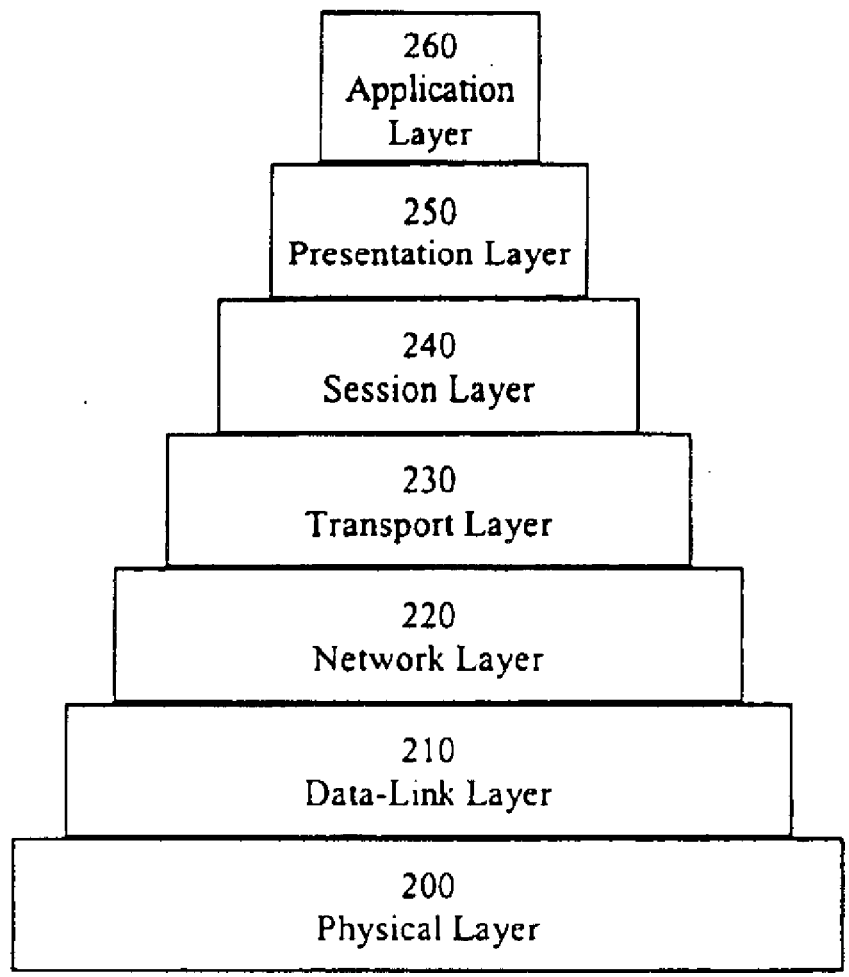
Figure 2: Seven Layers in Network Protocol

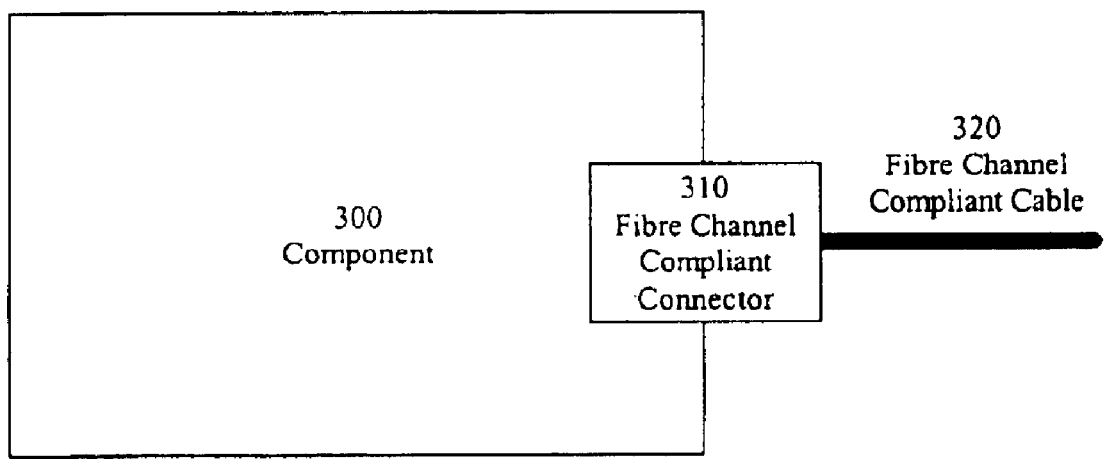
Figure 3: Fibre Channel Network Component

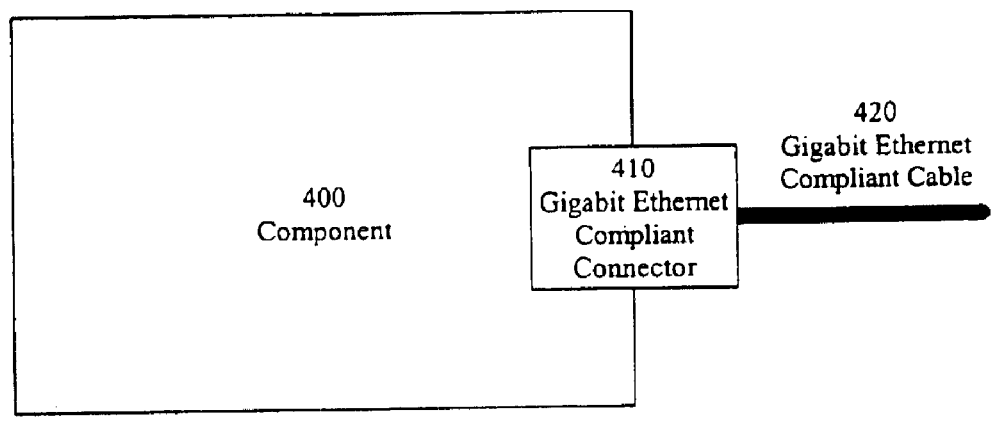
Figure 4: Gigabit Ethernet Network Component

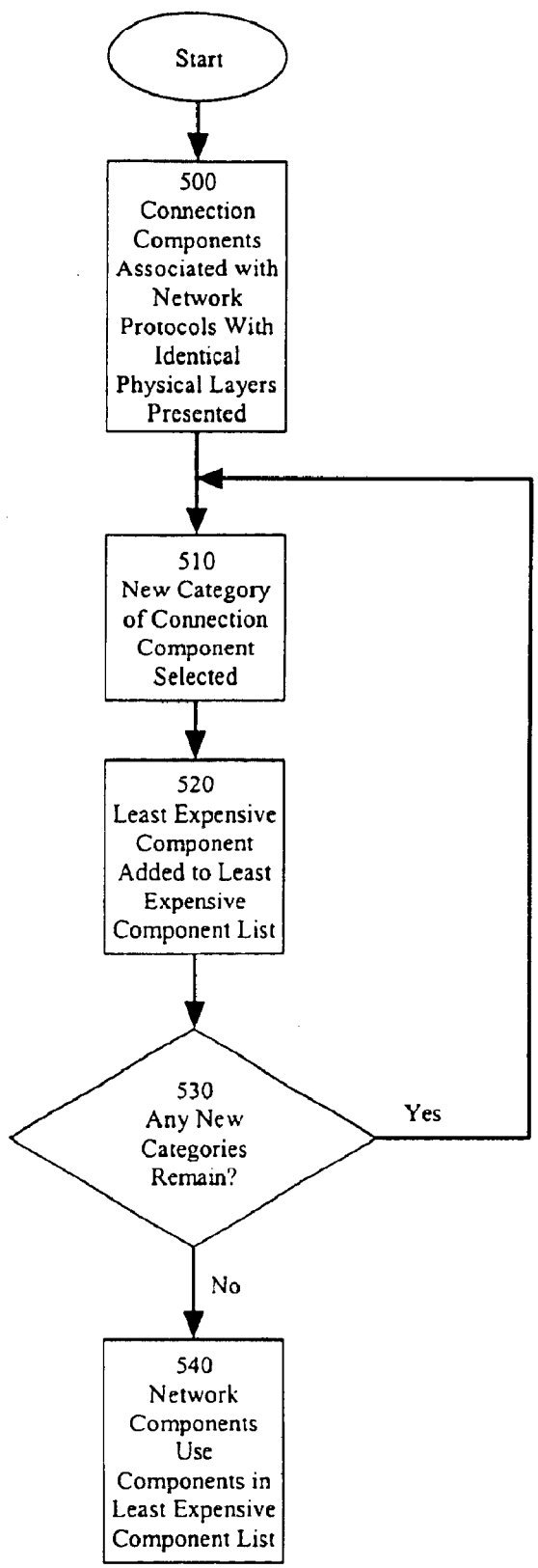
Figure 5: Connection Component Selection

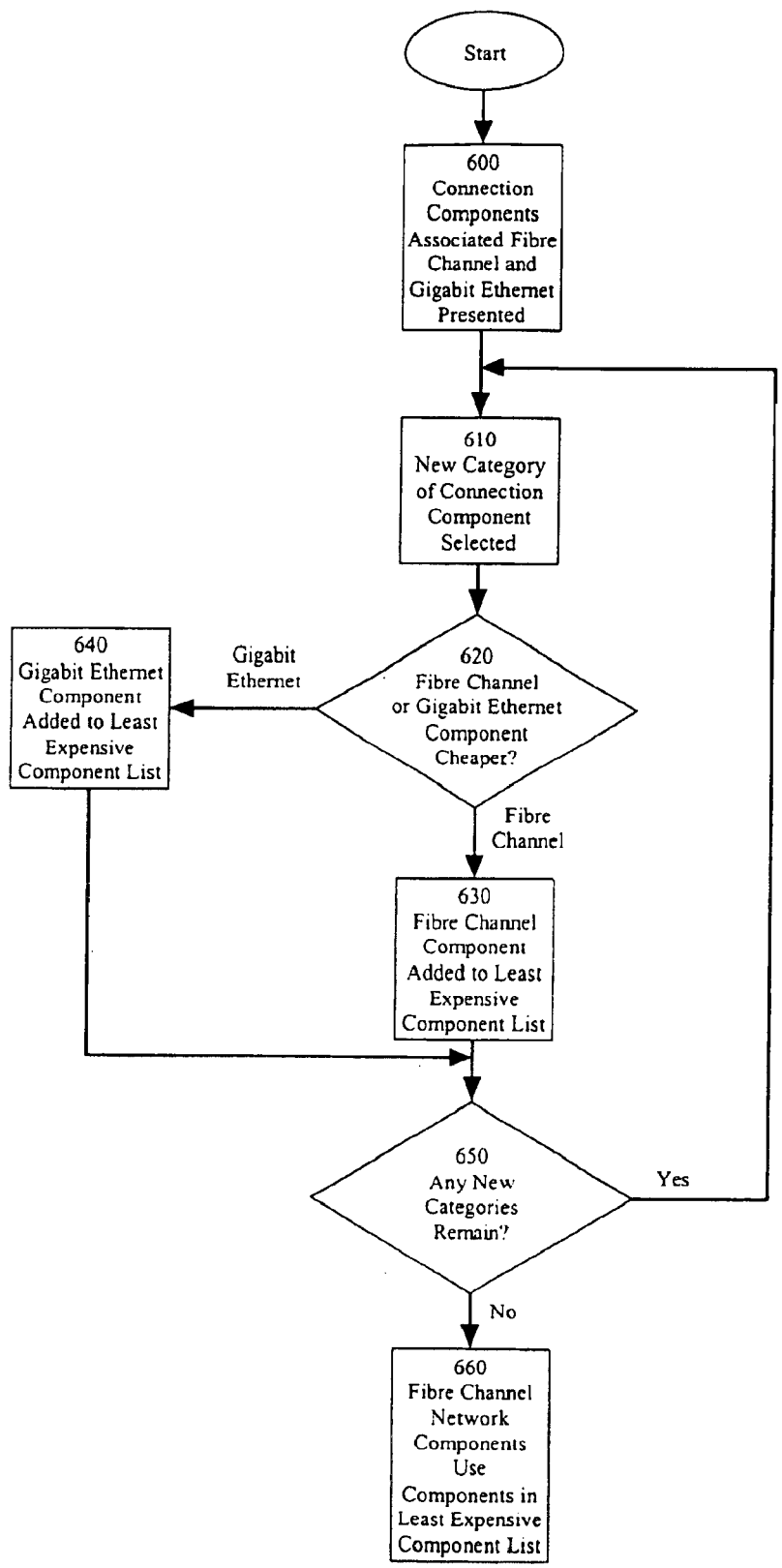
Figure 6: Connection Component Selection For Fibre Channel Network Components

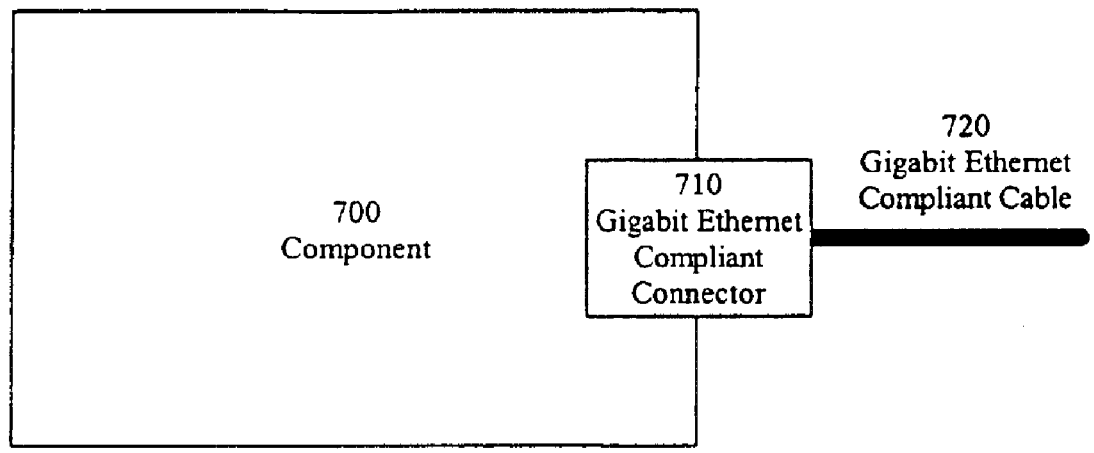
Figure 7: Fibre Channel Network Component

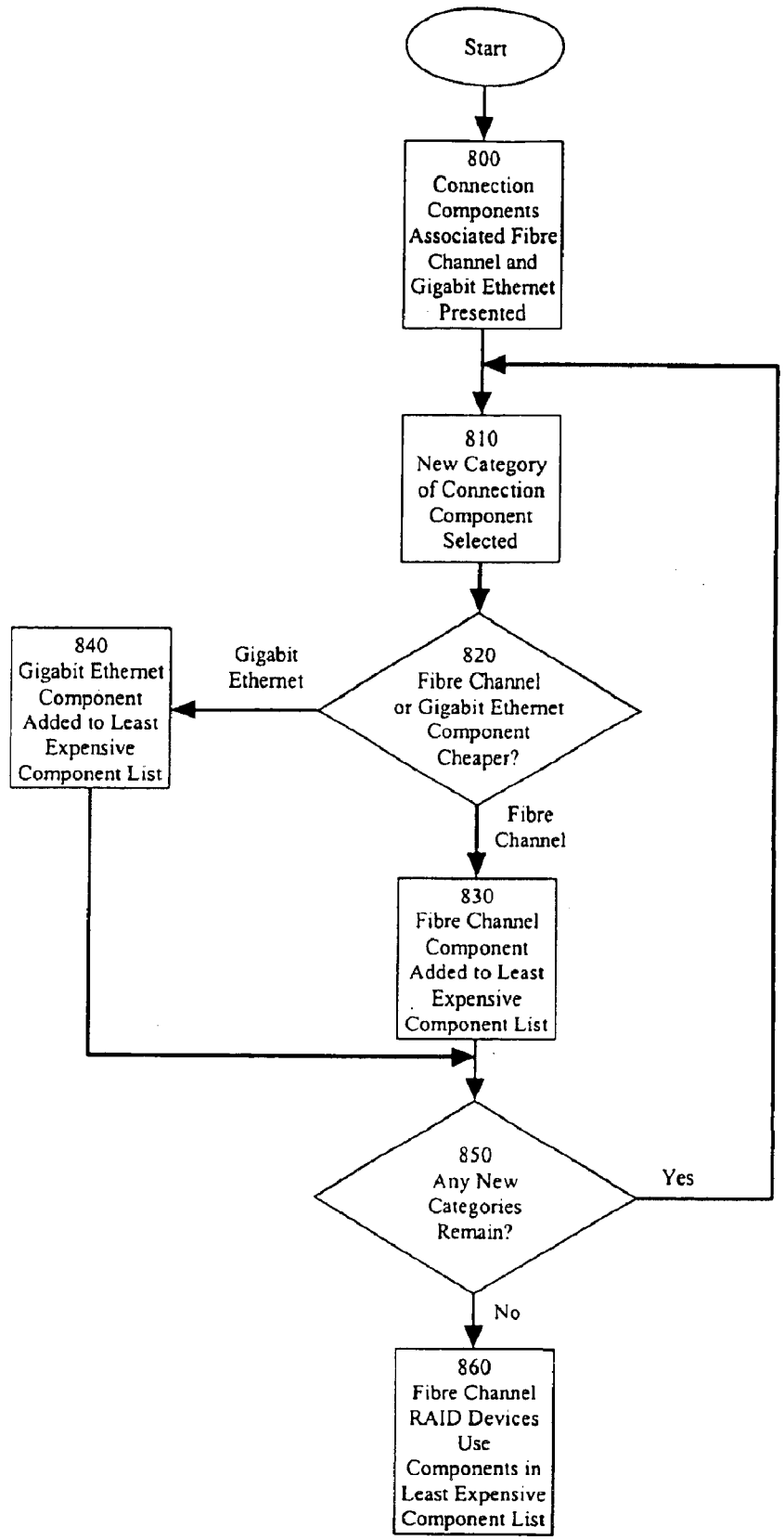
Figure 8: Connection Component Selection For Fibre Channel RAID Devices

METHOD AND APPARATUS FOR DESIRABLE NETWORK COMPONENTS

BACKGROUND OF THE INVENTION

1. Field of the Invention

The present invention relates to the field of computer networks, and in particular to a method and apparatus for desirable network components.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Computer network systems make use of one or more network components, such as storage devices. The network components are coupled to the computer network and are configured to communicate using the network protocol of the computer network. Some network protocols use connectors and cables for coupling to the network which are desirable for some purpose while other network protocols use connectors and cables for coupling to the network which are less desirable for that same purpose. Measures of desirability include cost, durability and size. Other measures of desirability also exist. Which measure of desirability is applied in a particular design depends on the goals of the design.

Users and manufacturers of the network protocols which use less desirable connectors and cables desire to improve the desirability of the computer network without changing the network protocol. This problem can be better understood by a review of computer networks.

Computer Networks

Computer networks are groups of computers and computer components in which the computers and components are interconnected via computer cables, infrared light signals, or low-power radiowave transmissions over short distances to form local area networks (LANs) or via telephone lines, television cables, or satellite links to form wide-area networks (WANs). FIG. 1 illustrates one embodiment of a computer network. Terminals 1 (100), 2 (110) and 3 (120) are coupled with storage devices 1 (130) and 2 (140) via an interconnect (150).

Network Protocols

Once computers and computer components are interconnected, network protocols are used to allow computers and computer components to interpret the signals they receive from other members of the network. Network protocols are standardized rules for the format and exchange of messages that the end points in a network connection use to send signals between each other. Both end points must recognize and observe the protocol. Protocols are often described in an industry or international standard.

Network protocols also include flow control, which keeps a data sender from swamping a receiver with messages it has no time to process or space to store, and error control, which involves error detection and automatic resending of messages to compensate for errors in transmission.

The standardization of protocols is an international effort. Since it would otherwise be impossible for different kinds of machines running diverse operating systems to communicate with one another, the key concern has been that system components (computers) be "open" (i.e., open for communication with other open components). This terminology comes from the open systems interconnection (OSI) communication standards, established by the International Organization for Standardization. The OSI reference model specifies protocol standards in seven layers.

FIG. 2 illustrates the seven layers for network protocol in accordance with OSI standards. The layers, from lowest to highest, are the physical layer (200), the datalink layer (210), the network layer (220), the transport layer (230), the session layer (240), the presentation layer (250) and the application layer (260).

The layering provides a modularization of the protocols and hence of their implementations. Each layer is defined by the functions it relies upon from the next lower level and by the services it provides to the layer above it. At the lowest level, the physical layer, rules for the transport of bits across a physical link are defined. Next, the data-link layer handles standard-size packets of data bits and adds reliability in the form of error detection and flow control.

Network and transport layers (often combined in implementations) break up messages into the standard-size packets and route them to their destinations. The session layer supports interactions between application processes on two hosts (machines). For example, it provides a mechanism with which to insert checkpoints (saving the current status of a task) into a long file transfer so that, in case of a failure, only the data after the last checkpoint need to be retransmitted. The presentation layer is concerned with such functions as transformation of data encodings, so that heterogeneous systems may engage in meaningful communication.

At the highest, or application, layer are protocols that support specific applications. An example of such an application is the transfer of files from one host to another. Another application allows a user working at any kind of terminal or workstation to access any host as if the user were local.

Fibre Channel

Fibre Channel (FC) is an industry-standard, high-speed network protocol. The FC standard supports bandwidths of 133 Megabits per second (Mb/sec.), 266 Mb/sec., 532 Mb/sec., 1.0625 Gigabits per second (Gb/sec.), and 4 Gb/sec. (proposed) at distances of up to ten kilometers. Gigabit Fibre Channel's maximum data rate is 100 Megabytes per second (MB/sec.) (200 MB/sec. full-duplex) after accounting for overhead.

In addition to its strong channel characteristics, Fibre Channel provides powerful networking capabilities, allowing switches and hubs to enable the interconnection of systems and storage into tightly-knit clusters. These clusters are capable of providing high levels of performance for file service, database management, or general purpose computing. Because it is able to span up to 10 kilometers between nodes, Fibre Channel allows the very high speed movement of data between systems that are greatly separated from one another.

FC is also a high-reliability interconnect. The interface is robust enough to allow multiple devices to be removed from the loop at one time with no interruption in data transfer. In addition, the interface attaches sophisticated error detecting codes to each packet of user data. These codes are check by the receiver of the data, which request a re-send if there is any discrepancy. However, electronic components used with FC devices are more expensive than electronic components used with other network protocol devices.

FIG. 3 illustrates a Fibre Channel network component. The component (300) contains a Fibre Channel compliant connector (310) which couples to a Fibre Channel compliant cable (320). The connector and cable both operate at the physical layer of the Fibre Channel network protocol.

Gigabit Ethernet

Gigabit Ethernet is a local area network (LAN) transmission standard that provides a data rate of 1 billion bits per second (one gigabit). Gigabit Ethernet is defined in the IEEE 802.3 standard and is used as an enterprise backbone. Gigabit Ethernet is carried primarily on optical fiber (with very short distances possible on copper media). Existing Ethernet LANs with 10 and 100 Mb/sec. cards can feed into a Gigabit Ethernet backbone. For example, Gigabit Ethernet devices can use CAT-5 twisted pair cables with RJ-45 connectors.

CAT-5 is one of several categories of standards defined by the American National Standards Institute/Electronic Industries Association (ANSI/EIA) Standard 568. The standards categories specify twisted pair cabling systems (wires, junctions, and connectors) in terms of the data rates that the systems can sustain. The specifications describe the cable material as well as the types of connectors and junction blocks to be used in order to conform to a category.

CAT-5 is the category incorporated into the Gigabit Ethernet specification for short distance wiring. While longer connections using Gigabit Ethernet use fiber optic cables. The CAT-5 wiring is already in place in many network systems for the final connection to desktop network components. Thus, Gigabit Ethernet is less expensive to install in such network systems.

Electronic components used in Gigabit Ethernet devices are less expensive than electronic components used for the same function in Fibre Channel devices. Additionally, the physical layer of Gigabit Ethernet is identical to the physical layer of Fibre Channel.

FIG. 4 illustrates a Gigabit Ethernet network component. The component (400) contains a Gigabit Ethernet compliant connector (410) which couples to a Gigabit Ethernet compliant cable (420). The connector and cable both operate at the physical layer of the Gigabit Ethernet network protocol.

SUMMARY OF THE INVENTION

The present invention provides a method and apparatus for desirable network components. One embodiment selects connection components for use in network components. In this embodiment the most desirable components are selected from a set of components associated with a plurality of network protocols wherein the network protocols have identical physical layers. The most desirable connection components are used to make network components for the plurality of network protocols. In one embodiment, desirability is measured by cost. Thus, network components are available for some network protocols at a reduced cost.

One embodiment of the present invention uses Gigabit Ethernet connection components as the connection components for network devices which communicate using the Fibre Channel network protocol. Since the physical layer of Gigabit Ethernet and Fibre Channel are the same, the less expensive Gigabit Ethernet components carries the electronic signals to the Fibre Channel devices in the same way as Fibre Channel connection components. Thus, the embodiment communicates using the Fibre Channel protocol over Gigabit Ethernet components. In one embodiment of the present invention, the network component is a storage device such as a redundant array of inexpensive disks (RAID) device.

BRIEF DESCRIPTION OF THE DRAWINGS

These and other features, aspects and advantages of the present invention will become better understood with regard to the following description, appended claims and accompanying drawings where:

FIG. 1 is a block diagram of a computer network.

FIG. 2 is a block diagram of the layers for computer network protocols in accordance with open systems interconnection communications standards.

FIG. 3 is a block diagram of a Fibre Channel network component.

FIG. 4 is a block diagram of a Gigabit Ethernet network component.

FIG. 5 is a flow diagram of the process of determining which connection components are used in accordance with one embodiment of the present invention.

FIG. 6 is a flow diagram of the process of selecting connection components for a Fibre Channel network component in accordance with one embodiment of the present invention.

FIG. 7 is a block diagram of a Fibre Channel network component in accordance with one embodiment of the present invention.

FIG. 8 is a flow diagram of the process of selecting connection components for a Fibre Channel RAID device in accordance with one embodiment of the present invention.

DETAILED DESCRIPTION OF THE INVENTION

The invention is a method and apparatus for desirable network components. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

In one embodiment of the present invention, network components (e.g., a disk drive) which communicate with one protocol use the connection components of another protocol which has the identical physical layer where the connection components of the second protocol are more desirable than the first.

The physical layer of the protocol dictates how to transport bits across a physical link. Thus, the connectors and cables of one protocol which comprise the physical link behave in the same way as connectors and cables of a second protocol whenever the two protocols share the same physical layer. As a result, when two protocols have the same physical layer, the connectors and cables used with those protocols are interchangeable.

In one embodiment, during the manufacture of Fibre Channel disk drives, Gigabit Ethernet connectors are used in the drives. In another embodiment, as Fibre Channel devices which use Gigabit Ethernet connectors are coupled to new networks, Gigabit Ethernet cable is used instead of the more expensive Fibre Channel cable.

Interchangeable Connection Components

The physical layer of message transmission describes the rules for the transport of bits across a physical link or connection. Thus, if two network protocols have identical physical layers, connection components which operate under those physical layer rules operate with both network protocols.

One embodiment of the present invention reduces the cost of some network components. In accordance with this embodiment, when it is determined that two network protocols have identical physical layers and each network protocol is associated with certain connection components, the less expensive of the connection components associated with either network protocol are used with network components regardless of which network protocol is in use. In one embodiment of the present invention, the network component is a storage device such as a redundant array of inexpensive disks (RAID) device.

FIG. 5 illustrates the process of determining which connection components are used in accordance with one embodiment of the present invention. This embodiment selects the least expensive connection components in all connection component categories. At step 500, connection components associated with a plurality of network protocols with identical physical layers are presented. At step 510 a new category of connection component (e.g., connectors) is selected. At step 520, the least expensive component of the selected category is added to a least expensive component list. At step 530, it is determined whether any new categories remain. If new categories remain, the process repeats at step 510. If no new categories remain, at step 540, network components which use one of the plurality of network protocols in step 500 use the components in the least expensive component list.

Fibre Channel with Gigabit Ethernet Components

One embodiment of the present invention uses Gigabit Ethernet connection components as the connection components for network devices which communicate using the Fibre Channel network protocol. Since the physical layer of Gigabit Ethernet and Fibre Channel are the same, the less expensive Gigabit Ethernet components carries the electronic signals to the Fibre Channel devices exactly the same as Fibre Channel connection components. Thus, the embodiment communicates using the Fibre Channel protocol over Gigabit Ethernet components. Since Gigabit Ethernet connection components are less expensive than Fibre Channel connection components, the embodiment reduces the cost of Fibre Channel network components.

FIG. 6 illustrates the selection of connection components for Fibre Channel network components in accordance with one embodiment of the present invention. At step 800, connection components associated with Fibre Channel and Gigabit Ethernet are presented. At step 610 a new category of connection component (e.g., connectors) is selected. At step 620, it is determined whether the Fibre Channel component or the Gigabit Ethernet component is less expensive.

If the Fibre Channel component is less expensive, at step 630, the Fibre Channel component is added to a least expensive component list and the process continues at step 650. If the Gigabit Ethernet component is less expensive, at step 640, the Gigabit Ethernet component is added to a least expensive component list and the process continues at step 650. At step 650, it is determined whether any new categories remain. If new categories remain, the process repeats at step 610. If no new categories remain, at step 660, Fibre Channel network components use the components in the least expensive component list.

FIG. 7 illustrates a Fibre Channel network component. The component (700) contains a Gigabit Ethernet compliant connector (710) which couples to a Gigabit Ethernet compliant cable (720). The connector and cable both operate at the physical layer of the Fibre Channel network protocol and the network component communicates using Fibre Channel.

Storage Devices

Storage devices are examples of computer network components. Computer networks typically make use of one or more storage devices, such as hard disks or tape drives, to store information.

RAID Systems

Storage devices utilizing redundant array of inexpensive disks (RAID) technology attempt to reduce the problem of disk failure by using a plurality of disks coupled together in parallel. Data is broken into chunks and copies are stored on multiple disks. These data chunks may be accessed simultaneously from multiple drives in parallel, or sequentially from a single drive. As a result, if one storage device fails, the data contained on that device can normally be recovered instantly from the redundant copies which are distributed throughout the other disks in the array.

RAID has several disk configurations referred to as RAID levels. Each RAID level has advantages and disadvantages. RAID systems provide techniques for protecting against disk failure. One feature common to the different RAID levels is that a disk (or several disks) stores parity information for data stored in the array of disks. In the case of a disk failure, the parity information stored in the RAID subsystem allows the lost data from a failed disk to be recalculated by RAID software.

FIG. 8 illustrates the process of creating a RAID device which communicates using the Fibre Channel network protocol in accordance with one embodiment of the present invention. At step 800, connection components for RAID storage devices associated with Fibre Channel and Gigabit Ethernet are presented. At step 810 a new category of connection component (e.g., connectors) is selected. At step 820, it is determined whether the Fibre Channel component or the Gigabit Ethernet component is less expensive.

If the Fibre Channel component is less expensive, at step 830, the Fibre Channel component is added to a least expensive component list and the process continues at step 850. If the Gigabit Ethernet component is less expensive, at step 840, the Gigabit Ethernet component is added to a least expensive component list and the process continues at step 850. At step 850, it is determined whether any new categories remain. If new categories remain, the process repeats at step 810. If no new categories remain, at step 860, Fibre Channel RAID devices use the components in the least expensive component list.

Thus, a method and apparatus for inexpensive network components is described in conjunction with one or more specific embodiments. The invention is defined by the following claims and their full scope an equivalents.

What is claimed is:

1. A method for connecting a network component to a network comprising:

obtaining a plurality of connection components configured to couple said network component to said network wherein each of said plurality of connection components comprise an identical physical layer and wherein each of the plurality of connection components is a different type of connection component;

determining a measure of desirability;

determining a connection component desirability using the measure of desirability for each of the plurality of connection components;

selecting a most desirable connection component from said plurality of connection components using the connection component desirability associated with each of the plurality of connection components; and connecting said most desirable connection component to said network component.

2. The method of claim 1 wherein said network component communicates using the Fibre Channel network protocol.

3. The method of claim 1 wherein said network component communicates using the Gigabit Ethernet network protocol.

4. The method of claim 1 wherein said network component is a storage device.

5. The method of claim 1 wherein at least one of said plurality of connection components is a connector.

6. The method of claim 1 wherein at least one of said plurality of connection components is a cable.

7. The method of claim 1 wherein said measure of desirability is cost.

8. The method of claim 1 wherein said measure of desirability is durability.

9. The method of claim 1 wherein said measure of desirability is size.

10. A network component comprising:

a most desirable connection component, wherein the most desirable connection component is selected by:

obtaining a plurality of connection components configured to couple a network component to said network wherein each of said plurality of connection components comprise an identical physical layer and wherein each of the plurality of connection components is a different type of connection component determining a measure of desirability;

determining a connection component desirability using the measure of desirability for each of the plurality of connection components;

selecting a most desirable connection component from said plurality of connection components using the connection component desirability associated with each of the plurality of connection components.

11. The network component of claim 10 wherein said network component communicates using the Fibre Channel network protocol.

12. The network component of claim 10 wherein said network component communicates using the Gigabit Ethernet network protocol.

13. The network component of claim 10 wherein said network component is a storage device.

14. The network component of claim 10 wherein at least one of said plurality of connection components is a connector.

15. The network component of claim 10 wherein at least one of said plurality of connection components is a cable.

16. The method of claim 10 wherein said measure of desirability is cost.

17. The method of claim 10 wherein said measure of desirability is durability.

18. The method of claim 10 wherein said measure of desirability is size.

19. A computer program product comprising:

a computer usable medium having computer readable program code embodied therein configured to connect a network component, said computer program product comprising functionality to:

obtain a plurality of connection components configured to couple a network component to said network wherein each of said plurality of connection components comprise an identical physical layer and wherein each of the plurality of connection components is a different type of connection component determine a measure of desirability;

determine a connection component desirability using the measure of desirability for each of the plurality of connection components;

select a most desirable connection component from said plurality of connection components using the connection component desirability associated with each of the plurality of connection components; and connect said most desirable connection component to said network component.

20. The computer program product of claim 19 wherein said network component communicates using the Fibre Channel network protocol.

21. The computer program product of claim 19 wherein said network component communicates using the Gigabit Ethernet network protocol.

22. The computer program product of claim 19 wherein said network component is a storage device.

23. The computer program product of claim 19 wherein at least one of said plurality of connection components is a connector.

24. The computer program product of claim 19 wherein at least one of said plurality of connection components is a cable.

25. The method of claim 19 wherein said measure of desirability is cost.

26. The method of claim 19 wherein said measure of desirability is durability.

27. The method of claim 19 wherein said measure of desirability is size.

* * * * *